US008601103B2

(12) United States Patent
Sood

(10) Patent No.: US 8,601,103 B2
(45) Date of Patent: Dec. 3, 2013

(54) METHOD, APPARATUS AND SYSTEM FOR DISTRIBUTING AND ENFORCING AUTHENTICATED NETWORK CONNECTION POLICY

(75) Inventor: Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1554 days.

(21) Appl. No.: 11/455,024

(22) Filed: Jun. 15, 2006

(65) Prior Publication Data

US 2007/0294760 A1    Dec. 20, 2007

(51) Int. Cl.
*G06F 15/173* (2006.01)

(52) U.S. Cl.
USPC .......................................................... 709/223

(58) Field of Classification Search
USPC .......................................................... 709/223
See application file for complete search history.

(56) References Cited

U.S. PATENT DOCUMENTS

| 6,873,611 | B2 * | 3/2005 | Rios ............................... 370/338 |
| 7,330,966 | B2 * | 2/2008 | Ice et al. ........................... 713/2 |
| 2003/0226038 | A1 * | 12/2003 | Raanan et al. ................. 713/201 |
| 2006/0005254 | A1 * | 1/2006 | Ross ............................... 726/27 |
| 2007/0097934 | A1 * | 5/2007 | Walker et al. .................. 370/338 |
| 2008/0016550 | A1 * | 1/2008 | McAlister ......................... 726/1 |

OTHER PUBLICATIONS

Ned Smith et al., "Nework Access Control for Many-Core Systems", U.S. Appl. No. 11/290,408, filed Nov. 29, 2005.
Kapil Sood et al., "Method, Apparatus and System for Platform Identity Binding in a Network Node", U.S. Appl. No. 11/323,333, filed Dec. 29, 2005.

* cited by examiner

*Primary Examiner* — Andrew Georgandellis
(74) *Attorney, Agent, or Firm* — Garrett IP, LLC

(57) ABSTRACT

A method, apparatus and system enable distribution and enforcement of authenticated network connection policy. Specifically, in one embodiment, a wireless network may admit manageability cores ("MCs") that include a manageability feature set, i.e., devices that do not implement the full wireless network feature set defined by IEEE standards. In one embodiment, the MCs and backend policy decision point ("PDP") may agree upon connection policy information for the MCs, and a may utilize a mutually authenticated mechanism to deliver the agreed upon connection policy information to the MCs and Access Points ("Aps").

25 Claims, 5 Drawing Sheets

FIG. 3

| | | |
|---|---|---|
| Byte 0 (Re-Authentication Modes) | Bit 0 | Re-Authenticate on AP transition |
| | Bit 1 | Re-Authenticate on IP or administrative domain change |
| | Bit 2 | Re-Authenticate on PDP change |
| | Bit 3 | Re-Authenticate on platform change (when any of the bits are set on the plat form configuration map) |
| | Bit 4 | Re-Authenticate once every Re-authentication period. |
| | Bit 5 | Re-Authenticate on every credential action (update/delete/modify) |
| | Bit 6 | Re-Authenticate on MC image/version change |
| | Bit 7 | |
| Byte 1 (Platform Configuration Map) | Bit 0 | Power Reset |
| | Bit 1 | OS Reboot |
| | Bit 2 | MC detects OS posture change |
| | Bit 3 | MC detects WLAN driver event (internal state) |
| | Bit 4 | WLAN re-connection to same or different AP/SSID |
| | Bit 5 | Filter Disabled or Events |
| | Bit 6 | MC detects Host WLAN roaming from the host driver |
| | Bit 7 | |
| | 6 Bytes | Manageability Core MAC Address |
| | 6 Bytes | AP/Switch MAC Address |
| | 0-34 Bytes | SSID (SSID Element) |
| | 32 Bytes | Network Access Server (NAS) Identifier (Address) |
| | 32 Byte | Authentication Server (PDP) Identifier (Address) |
| | 20 Byte | Credential Identifier |
| | 4 Bytes | Re-Authentication Period |
| | 4 Bytes | Deep Power Save Sleep Period |

METHOD, APPARATUS AND SYSTEM FOR DISTRIBUTING AND ENFORCING AUTHENTICATED NETWORK CONNECTION POLICY

BACKGROUND

Network technologies have grown rapidly in recent years and various standards have been promulgated for different types of networks, e.g., Institute for Electronics and Electrical Engineers ("IEEE") 802.11 Wide Local Area Networkss ("WLANs), IEEE 802.16 Wide Metropolitan Area Networks ("WMANs") and other networks such as 3GPP ($3^{rd}$ Generation Partnership Project) Cellular Networks, Private Networks, Wired LANs, and Ultra Wide Band ("UWB") wireless networks. In particular, wireless networks have proliferated at a rapid pace as computer users have become increasingly mobile.

Various manageability elements or "manageability cores" (hereafter "MC") may perform specialized management functions on the wireless networks. MCs may include a variety of components such as a "manageability engine" on an Intel® processor platform (e.g., utilizing Active Management Technologies ("AMT"), "Manageability Engine" ("ME") or Platform Resource Layer ("PRL"), a protected virtual machine on a virtualization platform, a secured and memory partitioned Operating System ("OS") running on one core of a multi-core Intel® platform, an integrated Trusted Platform Module ("TPM") with a "manageability engine", or, within the context of a mesh network, the MC may include a mesh node. Each MC may comprise hardware, firmware and/or software drivers that implement the appropriate protocol for the network (e.g., IEEE 802.11) to enable the MC to connect to the network, say an IEEE 802.11 Access Point. MCs may additionally include the hardware, firmware and/or software components for securely communicating with the network services authentication and authorization servers.

MCs typically include stand-alone, headless devices on client end-points such as mobile laptops, mobility handhelds, desktops, servers, and other such platforms, and they are usually connected to backend automated systems. In other words MCs may exist within any of those client end-points and are responsible for getting the client end-points automatically connected to the wireless network(s) as well as maintaining the devices on the networks. As a result, the MCs focus solely on management tasks, i.e., the traffic generated by the MCs (hereafter "manageability traffic") varies from the normal data and voice traffic on typical user networks. For example, manageability traffic is typically intermittent and occurs in short bursts. Additionally, manageability traffic may tolerate more delays than typical user traffic, does not have to compete with the user traffic and is typically end-to-end protected.

Manageability traffic is thus effectively running on its own virtual network (hereafter "manageability network"), existing within a typical wireless network. In other words, since these manageability networks do not require the full feature sets necessary for typical user network traffic (e.g., Quality of Service ("QoS") capabilities, standard power saving features, special features for traffic prioritization, fast handoffs, etc.), they may be treated as specialized virtual networks, distinct from the underlying user networks. The "reduced" feature set required by manageability traffic may hereafter be referred to as a "manageability feature set".

BRIEF DESCRIPTION OF THE DRAWINGS

The present invention is illustrated by way of example and not limitation in the figures of the accompanying drawings in which like references indicate similar elements, and in which:

FIG. 3 illustrates an example of various fields in a network connection policy information element according to embodiments of the present invention;

DETAILED DESCRIPTION

Embodiments of the present invention provide a method, apparatus and system for distributing and managing authenticated network connection policy. More specifically, embodiments of the present invention enable MCs with manageability feature sets to enter wireless networks according to a secure, authenticated network connection policy. Any reference in the specification to "MC" includes devices with manageability feature sets. Furthermore, reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

Wireless networks currently do not distinguish between MCs and other wireless devices on the network. Thus, although as described above, manageability traffic differs significantly from typical user network traffic, the MCs that generate the manageability traffic are nonetheless forced to conform to the requirements of user wireless networks. Since MCs typically function in short bursts, for example, MCs theoretically may reduce power consumption on the platform by going into deep sleep modes, e.g., 500 milliseconds or more, before they wake up to check for buffered packets. Currently, however, since deep-sleep modes are not supported by default in user wireless networks, MCs are forced to implement standard power savings features in order to be admitted onto these networks. Similarly, MCs are forced to implement QoS and roaming standards, although these types of features are unnecessary to the manageability network.

Embodiments of the present invention provide a scheme by which wireless networks may provide special treatment for MCs. More specifically, embodiments of the present invention enable MCs to enter a wireless network according to a defined authentication mechanism by which the MCs and access points ("Aps") may agree upon and manage wireless connection policy on a manageability network. As previously discussed, for the purposes of this specification, a manageability network includes a separate virtual LAN ("VLAN") on a corporate network and/or special wireless LAN segregation (e.g., a manageability Service Set Identifier "SSID") for connectivity. This manageability SSID may be a virtual AP, part of a single physical AP supporting multiple SSIDs, or a separate AP supporting the manageability SSID.

Figure 1:
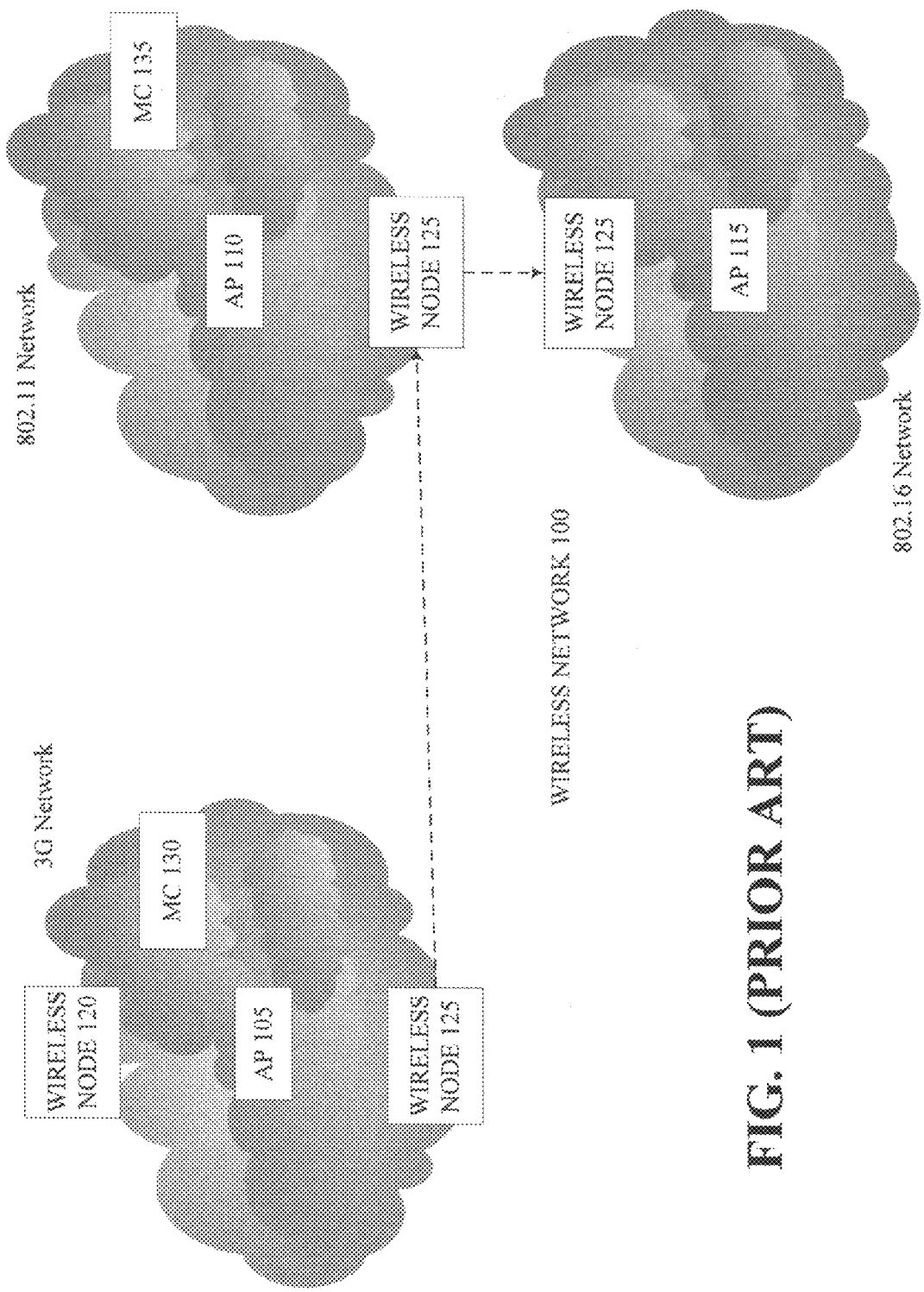
FIG. 1 illustrates a typical wireless network topology.

In order to facilitate understanding of embodiments of the present invention, FIG. 1 describes a typical wireless network topology. The following description highlights only the elements of the wireless network used to describe embodiments of the present invention. It will be readily apparent to those of ordinary skill in the art that various other components that may also reside on wireless networks have been omitted herein in order to avoid obscuring embodiments of the present invention. These other components may, however, be implemented within a wireless network without affecting the functionality of the embodiments of the invention described below.

As illustrated in FIG. 1, Wireless Network 100 may comprise a collection of different types of networks, e.g., an 802.11 network, an 802.16 network and a 3G network. 3G networks are well known to those of ordinary skill in the art and include networks that conform to the 3G International Telecommunications Union ("ITU") specification for mobile communications technology. In alternate embodiments, Wireless Network 100 may comprise the same types of networks and/or a different combination of network types. Additionally, Wireless Network 100 may comprise any type of network architecture, including but are not limited to WLANs, WWANs including 3G networks, WMANs and/or corporate intranets.

As illustrated, Wireless Network 100 may include one or more access points or APs (illustrated conceptually as "AP 105", "AP 110" and "AP 115" in FIG. 1 and referred to collectively as "APs") and one or more end nodes (illustrated conceptually as "Wireless Node 120" and "Wireless Node 125" in FIG. 1 and referred to collectively as "Wireless Nodes"). Wireless Network 100 may additionally include MCs (illustrated conceptually as "MC 130" and "MC 135" in FIG. 1 and referred to collectively as MCs). It will be readily apparent to those of ordinary skill in the art that although only a limited number of APs, Wireless Nodes and MCs are illustrated, embodiments of the present invention are not so limited. It will be additionally apparent to those of ordinary skill in the art that although the MCs are illustrated as separate entities from the Wireless Nodes, the MCs may, but are not required to, reside on the same platform as the Wireless Nodes.

Wireless Nodes 120 and 125 may comprise any type of device that is capable of communicating wirelessly with other devices. Generally such devices may include personal computers, servers, laptops, portable handheld computers (e.g., personal digital assistants or "PDAs"), set-top boxes, intelligent appliances, wireless telephones, web tablets, wireless headsets, pagers, instant messaging devices, digital cameras, digital audio receivers, televisions and/or other devices that may receive and/or transmit information wirelessly (including hybrids and/or combinations of the aforementioned devices). MCs, as previously described, may include a variety of components such as a "manageability engine" on an Intel® processor platform, a protected virtual machine on a virtualization platform, a secured and memory partitioned OS running on one core of a multi-core Intel® platform, an integrated TPM with a "manageability engine", or within the context of a mesh network, the MC may include a mesh node.

APs are "entry points" that provide Wireless Nodes and MCs with access to Wireless Network 100. It will be readily apparent to those of ordinary skill in the art that APs may comprise a standalone device and/or be incorporated as part of another network device such as a network bridge, router, or switch. Each AP typically has a predetermined range within which a Wireless Node or MC may freely roam without interruption. Thus, for example, as illustrated, if Wireless Node 125 or MC 135 are initially within the predetermined range of AP 105 but thereafter move out of that range, Wireless Node 125 or MC 135 may have to reestablish their wireless connections via a new entry point (e.g., AP 115 at the new location). When Wireless Nodes or MCs come within the range of APs, the Wireless Nodes or MCs and the APs typically engage in a series of messages that are designed to initiate a communications session between the Wireless Node and the APs. The Wireless Nodes or MCs and APs may additionally engage in various exchanges designed to establish a secure link between the two points.

APs and MCs may communicate with one another using protocols and standards established by the IEEE for wireless communications. For example, some embodiments may conform to the IEEE 802.11 standard, while other embodiments may conform to IEEE 802.16 networks and/or wired networks like IEEE 802.3 Ethernet LANs. As previously discussed, however, MCs currently implement various unnecessary features in order for APs to recognize the MCs and admit them onto the wireless networks.

Embodiments of the present invention enable MCs to implement manageability feature sets (e.g., only features necessary to generate, deliver and monitor management traffic) while still being able to communicate with PDPs and/or APs and be admitted onto Wireless Network 100. More specifically, according to embodiments of the present invention, Wireless Network 100 may allow MCs (with manageability feature-sets) to get onto the network without being required to implement the full wireless network feature-set such as those required by 802.11e, 802.11r, 802.11k, 802.11w, and/or other amendments to the IEEE standards. In various embodiments, MCs may also be admitted onto the wireless network without implementing vendor specific features such as Cisco™ CCX enhancements.

According to embodiments of the present invention, in order to admit MCs onto Wireless Network 100, the network may treat MCs differently than full-featured wireless network devices. In other words, Wireless Network 100 may recognize MCs and accept predefined behavior from the MCs. The MCs and AP to which the MCs are connecting on Wireless Network 100 may agree upon a connection policy and a backend Policy Decision Point ("PDP") (also referred to as an Authentication Server ("AS"), hereafter referred to collectively as PDP) may then utilize a mutual authentication mechanism to deliver this agreed upon connection policy to the MC and the AP. Verification of MC identity may be performed by Wireless Network 100 when the MCs security credentials are presented during the typical wireless network security procedures, while verification of PDP identity may be performed by the MC when PDP security credentials are presented during typical wireless network security procedures.

Since MCs typically include stand-alone, headless devices on client end-points such as mobile laptops, mobility handhelds, desktops, servers, and other such platforms, they are usually connected to backend automated systems and there is no user involvement in the manageability interaction with Wireless Network 100. As a result, in one embodiment, the connection policy between the MCs and APs may be highly automated and include the following features (i) the AP may recognize the MC presence on network, and the MC may recognize special manageability support capabilities on the AP; (ii) the AP may buffer packets for the MC when the MC is in a deep sleep; (iii) the AP may allow the MC to stay in a deep sleep state for extended periods, to conserve the MC power scan time; (iv) the MC may not include all typical IEEE functionality, and thus, the AP may be instructed to accept the MC as a special entity; and (v) the MC may have sparse network traffic through the AP, and the Wireless Network 100 may ensure that security and associations are not disabled at the AP for the MC (e.g., by increasing the timeout values at the AP and MC, as described in further detail below).

According to embodiments of the present invention, a Network Connection Policy Information Element ("NetPolicy IE") may be defined to enable the PDP to deliver network connection policy information to the MC and AP. In one embodiment, this policy information may be delivered to the communicating end-points (i.e., the MC and the AP) using an authenticated and protected tunnels. For example, the Master Secret Key ("MSK") used during the mutual authentication process (in one embodiment, using Extensible Authentication Protocol "EAP") between the MC and the PDP may be used to protect the tunnel and all communication between the MC and the PDP. The NetPolicy IE which is communicated by the PDP to the AP may be protected using a Federal Information Processing Standard ("FIPS") approved key wrap algorithm, such as Advanced Encryption Standard ("AES") using a common shared secret Key Wrap Key ("KWK"). The concept of MSKs, EAP, authentication, FIPS and KWK are well known to those of ordinary skill in the art and further description thereof is omitted herein in order not to unnecessarily obscure embodiments of the present invention.

Figure 2:
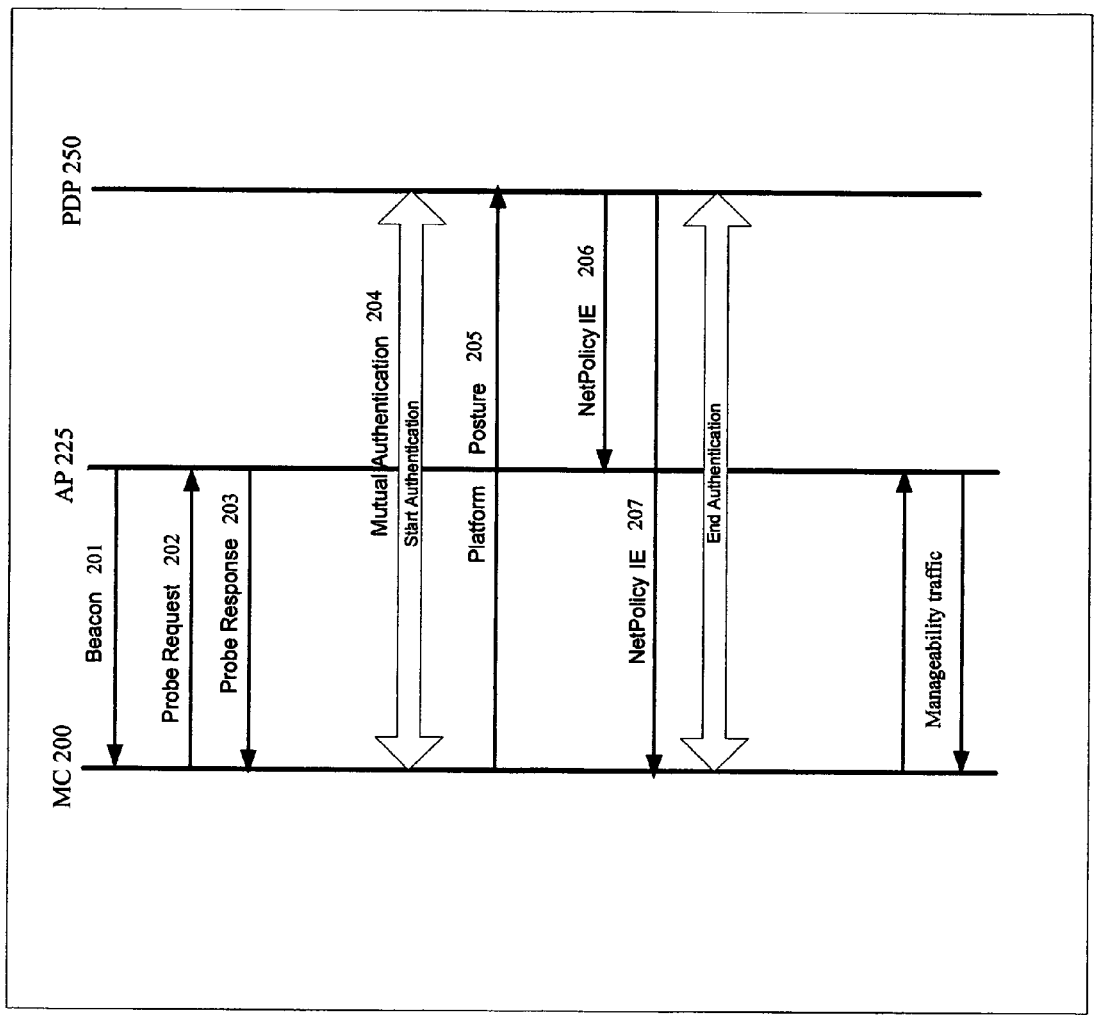
FIG. 2 illustrates an embodiment of the present invention.

FIG. 2 illustrates an embodiment of the present invention. In 201-203, MC 200 may negotiate and reach an understanding with AP 225 for a common feature support capability (hereafter "a connection policy"). In one embodiment, this negotiation may be performed using beacons (201) and probe requests (202) and responses (203), with special flags or NetPolicyIEs, indicating to MC 200 that Wireless Network 100 supports and enables manageability capabilities. In 204, AP 225 may allow MC 200 establish a secure tunnel with PDP 250 and perform wireless network Authentication (e.g., EAP authentication) with PDP 250 using AP 225's controlled port. According to an embodiment of the present invention, the protected tunnel may be established between MC 200 and PDP 250 (e.g., an EAP tunnel using MSK) to provide confidentiality and source authentication of all data communicated between MC 200 and the PDP 250. This initial secure tunnel may be established based on startup configuration information established by a system administrator on MC 200 (e.g., which network to connect to). MC 200's network access control ("NAC") and identity and posture verification (i.e., verification of identity and software/hardware state of the MC) may be performed along with the authentication in 205. In an alternate embodiment, the posture authentication may be performed using an out-of-band protected channel, including an encrypted User Datagram Protocol ("UDP") or a protected XML protocol.

In one embodiment, upon verification of MC 200's posture and identity, PDP 250 may confirm that MC 200 is a manageability device using the credentials that MC 200 presented to PDP 250. In one embodiment, the credentials presented to PDP 250 may include MC 200's identity, identifying itself as a manageability core (configured by the information technology department, or by a trusted 3rd party). MC 200's identity in various embodiments include a higher level identity (e.g., a Device Identity, a TPM identity, EAP Identity, and User/IT Identity) that is used by PDP 250 to verify the assertion MC 200 is a manageability core. In one embodiment, the credentials bind the MAC address of MC 200 with its MC identity (e.g., by including the MAC address in the signing of the credential). The MAC address includes the identity that is understood by the lower-level wireless network components, such as the AP. Thus, in one embodiment, binding the higher level MC identity with the MAC address verifies the assertion that both belong to the same MC. According to embodiments of the present invention, since the wireless network security is based on the MAC identity, the NetPolicyIEs may include the MAC addresses of the AP and MC 200.

Upon confirmation that MC 200 is a manageability device (as described above), PDP 250 may create a NetPolicyIE for MC 200 and deliver the NetPolicyIE to MC 200 and AP 225 via the initially established secure tunnel. In one embodiment, if MC 200 disconnects from the network and subsequently reconnects, MC 200 may established a new secure tunnel between MC 200 and PDP 250 utilizing the previously propagated NetPolicyIEs (instead of the basic startup information established by the system administrator). Thus, for example, MC 200 may store the NetPolicyIEs received from PDP 250 initially, and when attempting to reconnect to the same PDP, MC 200 may utilize the same NetPolicies to establish a new secure tunnel. According to this example, once the new secure tunnel is established, MC 200 and PDP 250 may once again confirm that MC 200 is a manageability device by communicating within the secure tunnel. Once confirmed, PDP 250 and MC 200 may then renegotiate new NetPolicyIEs and these new NetPolicyIEs may be propagated to MC 200 and AP 225 via the protected tunnel. MC 200 may utilize these new NetPolicyIEs during its session on Wireless Network 100 and utilize the new NetPolicyIEs thereafter to reconnect to PDP 250.

Thereafter, MC 200 may be recognized on Wireless Network 100 as an MC device and may exhibit behavior different from other devices on Wireless Network 100 without danger of being rejected from the network. In other words, once MC 200 is authenticated on Wireless Network 100 according to embodiments of the present invention, MC 200 and AP 225 may exchange manageability traffic without conforming to non-manageability related wireless link network standards like QoS, fast roaming, etc, as these are not essential for manageability traffic As previously described, NetPolicy IEs may be defined to enable the PDP to deliver network connection policy information to the MC and AP. In one embodiment, NetPolicyIE may include a variety of fields used to define MC 200's behavior. In one embodiment, at Byte 0, NetPolicy IE may define "Re-Authentication Modes", i.e., how MC 200 handles re-authentication upon various transitions or simply at predetermined intervals. Similarly, NetPolicyIE may include a field in Byte 1 that determines the platform configuration map, i.e., a bit map of all platforms conditions that may trigger MC 200 to re-authenticate the platform to the PDP of the Wireless Network 100.

FIG. 3 illustrates an example of NetPolicyIE fields according to embodiment of the present invention. For the purposes of illustration, the information in the fields is presented in a particular order, but embodiments of the invention are not so limited. Instead, the NetPolicyIE fields may be organized in various ways without departing from the spirit of embodiments of the present invention. Generally speaking, the NetPolicyIE fields contain information that MCs typically use to operate on Wireless Network 100. More specifically, the information in these NetPolicyIE fields may be used by MCs to automate connection, authentication and operation with Wireless Network 100 and PDP 250 without any user involvement. As illustrated in the example of FIG. 3, Byte 0 (301) and Byte 1 (302) may define different actions for MC 200 based on various inputs. Thus, while Bit 0 of Byte 0 (301) defines re-authentication upon AP transitions, Bit 1 of Byte 0 (301) may define re-authentication upon IP or administrative domain change (e.g., identified by the Network Access Server ("NAS") identifier (address) field). Similarly, Bits 2-6 of Byte 0 (301) may define respectively: (i) re-authentication upon a PDP change (e.g., identified by a change in the PDP identifier (address) field); (ii) re-authentication on a platform change (e.g., when any of the valid conditions specified in Byte 1 are met, for example, by setting a value 1 in the appropriate bit field); (iii) re-authentication during every re-authentication period (e.g., as defined in Byte 1); (iv) re-authentication on every credential action (e.g., every time MC 200's security credentials are updated/modified/deleted); and (v) re-authenticating on MC 200's image/version changes (including code and configuration changes on the MC).

In one embodiment, Byte 1 (302) may define a platform configuration map, i.e. a bit map of various platforms conditions that may trigger MC 200 to re-authenticate the platform to the PDP of the Wireless Network 100. As illustrated, Bits 0-6 of Byte 1 (302) may define respectively: (i) a power reset condition on the host; (ii) an OS reboot condition; (iii) an MC detected OS posture change; (iv) an MC detects wireless network driver event (internal state) condition (e.g., when MC detects a change in the wireless network driver condition (stopped, paused, etc.), or when a driver indicates an exception event to MC 200; (v) a wireless network re-connection condition (e.g., when a wireless network was disable/enabled on host, and re-connected to the same or different AP/SSID); (vi) a filter disabled or events condition (e.g., when MC 200 detects that the circuit breaker filters are disabled, or when MC 200 receives/generates an exception event regarding the filters); and (vii) a host wireless network roaming condition (e.g., when MC 200 detects that the wireless device has roamed or is in process of roaming to a new AP/SSID, where the indication may be sent from wireless device's wireless network driver to MC 200).

As illustrated in FIG. 3, in one embodiment of the invention, the platform configuration map additionally includes other fields such as a 6 byte MC MAC address field (MC 200's address bound to the higher level identity of MC 200, when presented for NAC authentication), a 6 byte AP MAC Address field (the MAC address (SSID of WLAN) of the AP which is used by MC 200 to authenticate to the PDP) or in an alternate embodiment, an IP address field, a 1-34 byte SSID field (or SSID element) which indicates additional SSIDs to which MC 200 may connect. In one embodiment of the invention, MC 200 may be provisioned with a specific SSID for manageability, and this field may allow system administrators to re-direct MC 200 to a different wireless network, as necessary. Additionally, the platform configuration may include a 32 byte NAS Identifier Address field that indicates the address of the NAS, used for future wireless network authentication (may also be used by MC 200 to verify the future IP address domain, e.g., MC 200 may re-authenticate using this NAS, when MC 200 moves into a new NAS domain, or when MC 200 moves into a new IP sub-domain) and a 32 byte PDP Identifier Address field that indicates the address of the PDP used for wireless network authentication (maybe used by MC 200 to re-authenticate when the PDP domain is changed, i.e., MC 200 has moved into a new administrative domain).

In one embodiment, the platform configuration map may also include a 20 byte credential identifier field, a 4 byte re-authentication period field and a 4 byte deep power save sleep period field. The credential identifier field may include a (hash) field indicating to MC 200 to use a specific set of credentials for authentication to the network. These fields may be common across all credentials and include, but are not limited to: (i) Subject Fields—Purpose of the credential, Key Usage; (ii) Issued By—Name of the mutually trusted party, Issuer Name; (iii) Type of credential—Public-Private Key pair, Symmetric key pair, Certificate format; and (iv) Authentication method—Name of the authentication method, like EAP-FAST, EAP-TLS, MS-CHAP, and combinations thereof.

The re-authentication period field may include a re-authentication period value that causes MC 200 to re-authenticate with the network once every re-authentication period. During the re-authentication period, AP 225 and MC 200 may maintain the WLAN/LAN Link Security Associations. And finally, the deep power save sleep period field may define a power save feature, i.e., it may indicate to MC 200 that MC 200 may sleep for a period specified by this parameter.

Figure 4:
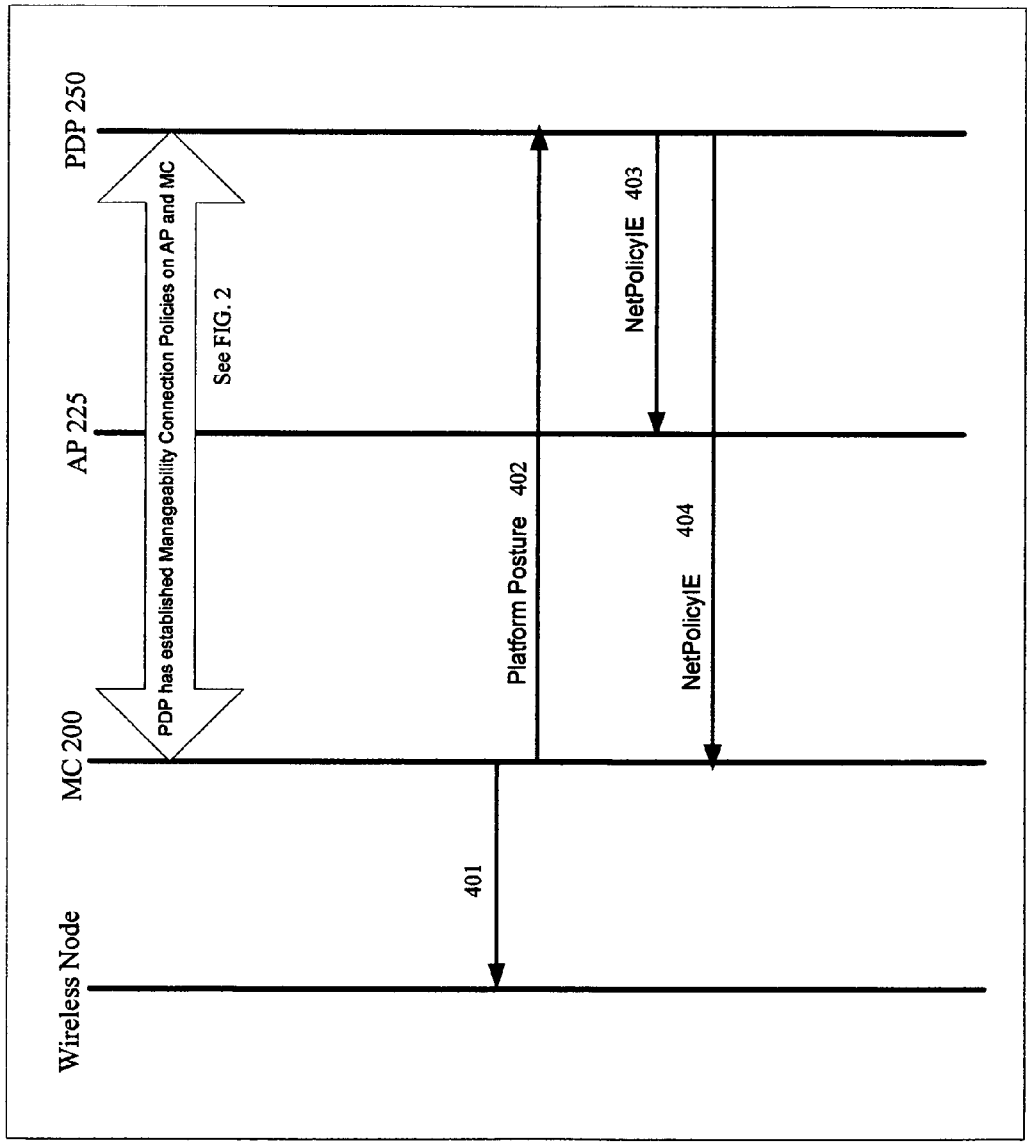
FIG. 4 illustrates an example authentication process according to the platform configuration map illustrated in FIG. 3.

FIG. 4 illustrates in further detail an example re-authentication process according to the platform configuration map illustrated in FIG. 3. As illustrated, in one embodiment, PDP 250 may establish NetPolicyIEs on MC 200 and AP 225 as previously discussed with respect to FIG. 2. Thereafter, upon the occurrence of a triggering event (e.g., platform OS reboots, wireless network state changes, wireless device roams to another AP, etc.), MC 200 may detect the event in 401 and the process of re-authentication may begin. In 402, MC 200 may inform PDP 250 of its posture changes and the posture changes of the wireless device, and renegotiate NetPolicyIEs. Thereafter, in 403, PDP 250 may distribute the newly renegotiated NetPolicyIEs to AP 225 and to MC 200 in 404. Upon completion of the re-authentication, MC 200 may continue to communicate with AP 225 and PDP 250 according to the newly renegotiated NetPolicyIEs until another triggering event, if any.

Figure 5:
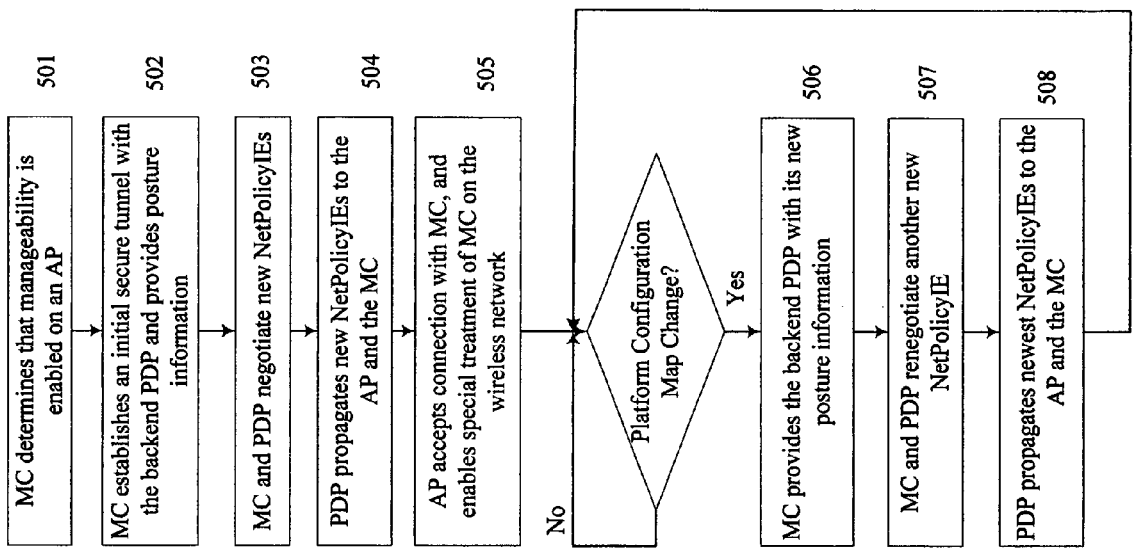
FIG. 5 is a flow chart illustrating an embodiment of the present invention.

FIG. 5 is a flow chart illustrating an embodiment of the present invention. Although the following operations may be described as a sequential process, many of the operations may in fact be performed in parallel and/or concurrently. In addition, the order of the operations may be re-arranged without departing from the spirit of embodiments of the invention. In 501, an MC determines that manageability is enabled on an AP. It will be readily apparent to those of ordinary skill in the art that MC may make this determination according to well-known schemes (e.g., a probe request from the MC and/or receiving a beacon from the AP). Thereafter, in 502, the MC may establish an initial secure tunnel with the PDP and provide the backend PDP with posture information via the initial secure tunnel. In 503, the MC and PDP may negotiate new NetPolicyIEs and in 504, the PDP may propagate the new NetPolicyIEs to the AP and the MC via the initial secure tunnel. In 505, the AP may accept the connection with the MC and enable special treatment of the MC on the wireless network. In the case of a change in the configuration mapping platform (e.g., a triggering event), the MC may in 506 provide the backend PDP with its new posture information and renegotiate another new NetPolicyIE in 507. The PDP may then propagate the newly renegotiated NetPolicyIE to the AP and the MC in 508.

The MCs according to embodiments of the present invention may be implemented on a variety of computing devices. According to an embodiment, a computing device may include various other well-known components such as one or more processors. The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such existing and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   determining by a manageability core (MC) that an access point (AP) is manageability enabled;
   establishing an initial secure tunnel between the MC and a policy decision point (PDP) utilizing one of a startup configuration and stored network connection policy information elements (NetPolicyIEs);
   providing the PDP with platform posture information for the MC via the initial secure tunnel;
   negotiating new NetPolicyIEs with the PDP, using at least one beacon, at least one probe request, and at least one probe response, based on the platform posture information; and
   propagating by the PDP the new NetPolicyIEs to the AP and the MC via the initial secure tunnel,
   wherein the new NetPolicyIEs allow the MC to enter, via the AP, a network associated with the AP without the MC having to implement a full feature set of a conununications protocol that is otherwise used by the network;
   wherein the entry of the MC into the network is in accordance with the new NetPolicyIEs that were negotiated with the PDP; and
   wherein the new NetPolicyIEs comprise
   a plurality of conditions upon which re-authentication is to be performed;
   a credential identifier field indicating, to the MC, to use specified credentials;
   a re-authentication period field that causes the MC to re-authenticate once per a specified re-authentication period; and
   a deep power save sleep period field indicating to the MC that the MC is permitted to sleep for a specified period.

2. The method according to claim 1 wherein the platform posture information for the MC includes high level MC identity information, verifiable by the PDP and bound to a Media Access Control ("MAC") address for the MC.

3. The method according to claim 1 further comprising creating a subsequent secure tunnel between the MC and the PDP utilizing the new NetPolicyIEs.

4. The method according to claim 1 wherein propagating by the PDP the new NetPolicyIEs to the AP and the MC include propagating the new NetPolicyIEs using a key wrap algorithm.

5. The method according to claim 1 wherein the new NetPolicyIEs include the Media Access Control ("MAC") address for the MC, a MAC address of the AP, and a wireless network identity.

6. The method according to claim 1 wherein the new NetPolicyIEs include a plurality of fields containing information used by MCs to operate on a wireless network.

7. The method according to claim 6 wherein the plurality of fields define actions to be taken by the MC based on triggering events.

8. The method according to claim 7 wherein the actions include renegotiating further NetPolicyIEs with the PDP upon occurrence of at least one of the triggering events.

9. The method according to claim 1 further comprising:
   detecting a change in the platform posture information for the MC;
   providing the changed platform posture information for the MC to the PDP:
   renegotiating further NetPolicyIE with the PDP based on the changed platform posture information; and
   propagating by the PDP the further NetPolicyIEs to the AP and the MC.

10. A system, comprising:
    a manageability enabled access point ("AP") on a wireless network;
    a manageability core ("MC") on the wireless network, the MC capable of detecting that the AP is manageability enabled; and
    a policy decision point (PDP) on the wireless network, the MC capable of establishing an initial secure tunnel with the PDP utilizing one of a startup configuration and stored network connection policy information elements (NetPolicyIEs), the MC further capable of providing the PDP with platform posture information for the MC via the initial secure tunnel, the MC further capable of negotiating new NetPolicyIEs with the PDP, using at least one beacon, at least one probe request, and at least one probe response, based on the platform posture information, the PDP capable of propagating by the PDP the new NetPolicyIEs to the AP and the MC via the initial secure tunnel,
    wherein the new NetPolicyIEs allow the MC to enter, via the AP, a network associated with the AP without the MC having to implement a full feature set of a conununications protocol that is otherwise used by the network;
    wherein the entry of the MC into the network is in accordance with the new NetPolicyIEs that were negotiated with the PDP;and
    wherein the new NetPolicyIEs comprise
    a plurality of conditions upon which re-authentication is to be performed;
    a credential identifier field indicating, to the MC, to use specified credentials;
    a re-authentication period field that causes the MC to re-authenticate once per a specified re-authentication period; and
    a deep power save sleep period field indicating to the MC that the MC is permitted to sleep for a specified period.

11. The system according to claim 10 wherein the posture information for the MC includes high level MC identity information, verifiable by the PDP and bound to a Media Access Control ("MAC") address for the MC.

12. The system according to claim 10 wherein the MC and the PDP are further capable of creating a subsequent secure tunnel between the MC and the PDP utilizing the new NetPolicyIEs.

13. The system according to claim 10 wherein the NetPolicyIEs include a Media Access Control ("MAC") address for the MC, a MAC address of the AP, and a wireless network identity.

14. The system according to claim 10 wherein the plurality of fields define actions to be taken by the MC based on triggering events.

15. The system according to claim 14 wherein the actions include renegotiating further NetPolicyIEs with the PDP upon occurrence of at least one of the triggering events.

16. The system according to claim 10 wherein the MC is further capable of detecting a change in the platform posture information, the MC additionally capable of providing the changed platform posture information to the PDP, the MC and PDP thereafter capable of renegotiating another new NetPolicyIE based on the changed platform posture information, the PDP thereafter capable of propagating the further NetPolicyIEs to the AP and the MC.

17. An article comprising a non-transitory machine-accessible medium having stored thereon instructions that, when executed by a machine, cause the machine to:
   determine that an access point (AP) is manageability enabled;
   establish an initial secure tunnel between the machine and a policy decision point (PDP) utilizing one of a startup configuration and stored network connection policy information elements (NetPolicyIEs);
   provide the PDP with platform posture information via the initial secure tunnel; and
   negotiate new NetPolicyIEs with the PDP, using at least one beacon, at least one probe request, and at least one probe response, based on the platform posture information,
   wherein the new NetPolicyIEs allow the MC to enter, via the AP, a network associated with the AP without the MC having to implement a full feature set of a communications protocol that is otherwise used by the network,
   wherein the entry of the MC into the network is in accordance with the new NetPolicyIEs that were negotiated with the PDP, and
   wherein the new NetPolicyIEs comprise
   a plurality of conditions upon which re-authentication is to be performed;
   a credential identifier field indicating, to the MC, to use specified credentials;
   a re-authentication period field that causes the MC to re-authenticate once per a specified re-authentication period; and
   a deep power save sleep period field indicating to the MC that the MC is permitted to sleep for a specified period.

18. The article according to claim 17 wherein the platform posture information includes high level identity information, verifiable by the PDP and bound to a Media Access Control ("MAC") address for the machine.

19. The article according to claim 17 wherein the instructions, when executed by the machine further create a subsequent secure tunnel between the MC and the PDP utilizing the new NetPolicyIEs.

20. The article according to claim 17 wherein the instructions, when executed by the machine, further cause the machine to:
   detect a change in the platform posture information;
   provide the changed platform posture information to the PDP; and
   renegotiate further NetPoliciyIEs with the PDP based on the changed platform posture information.

21. An article comprising a non-transitory machine-accessible medium having stored thereon instructions that, when executed by a machine, cause the machine to:
   enable a manageability core ("MC") to establish a secure tunnel with the machine utilizing one of a startup configuration and stored network connection policy information elements (NetPolicyIEs);
   receive from the MC platform posture information via the initial secure tunnel;
   negotiate new network connection policy information elements (NetPolicyIEs) with the MC, using at least one beacon, at least one probe request, and at least one probe response, based on the platform posture information; and
   propagate the new NetPolicyIEs to the MC and an access point ("AP"),
   wherein the new NetPolicyIEs allow the MC to enter, via the AP, a network associated with the AP without the MC having to implement a full feature set of a communications protocol that is otherwise used by the network;
   wherein the entry of the MC into the network is in accordance with the new NetPolicyIEs that were negotiated with the PDP; and
   wherein the new NetPolicyIEs comprise
   a plurality of conditions upon which re-authentication is to be performed;
   a credential identifier field indicating, to the MC, to use specified credentials;
   a re-authentication period field that causes the MC to re-authenticate once per a specified re-authentication period; and
   a deep power save sleep period field indicating to the MC that the MC is permitted to sleep for a specified period.

22. The article according to claim 21 wherein the instructions, when executed by the machine, further cause the machine to establish a subsequent secure tunnel between the machine and the MC utilizing the new NetPolicyIEs.

23. The article according to claim 21 wherein the instructions, when executed by the machine, further cause the machine to propagate the new NetPolicyIEs to the AP and the MC using a key wrap algorithm.

24. The articled according to claim 21 wherein the new NetPolicyIEs include a Media Access Control ("MAC") address for the MC, a MAC address of the AP, and a wireless network identity.

25. The article according to claim 21 wherein the instructions, when executed by the machine, further cause to the machine to:
   receive changed platform posture information for the MC;
   renegotiate further NetPolicyIEs with the MC based on the changed platform posture information; and
   propagate the further NetPolicyIEs to the MC and the AP.

* * * * *